Patented Apr. 17, 1934

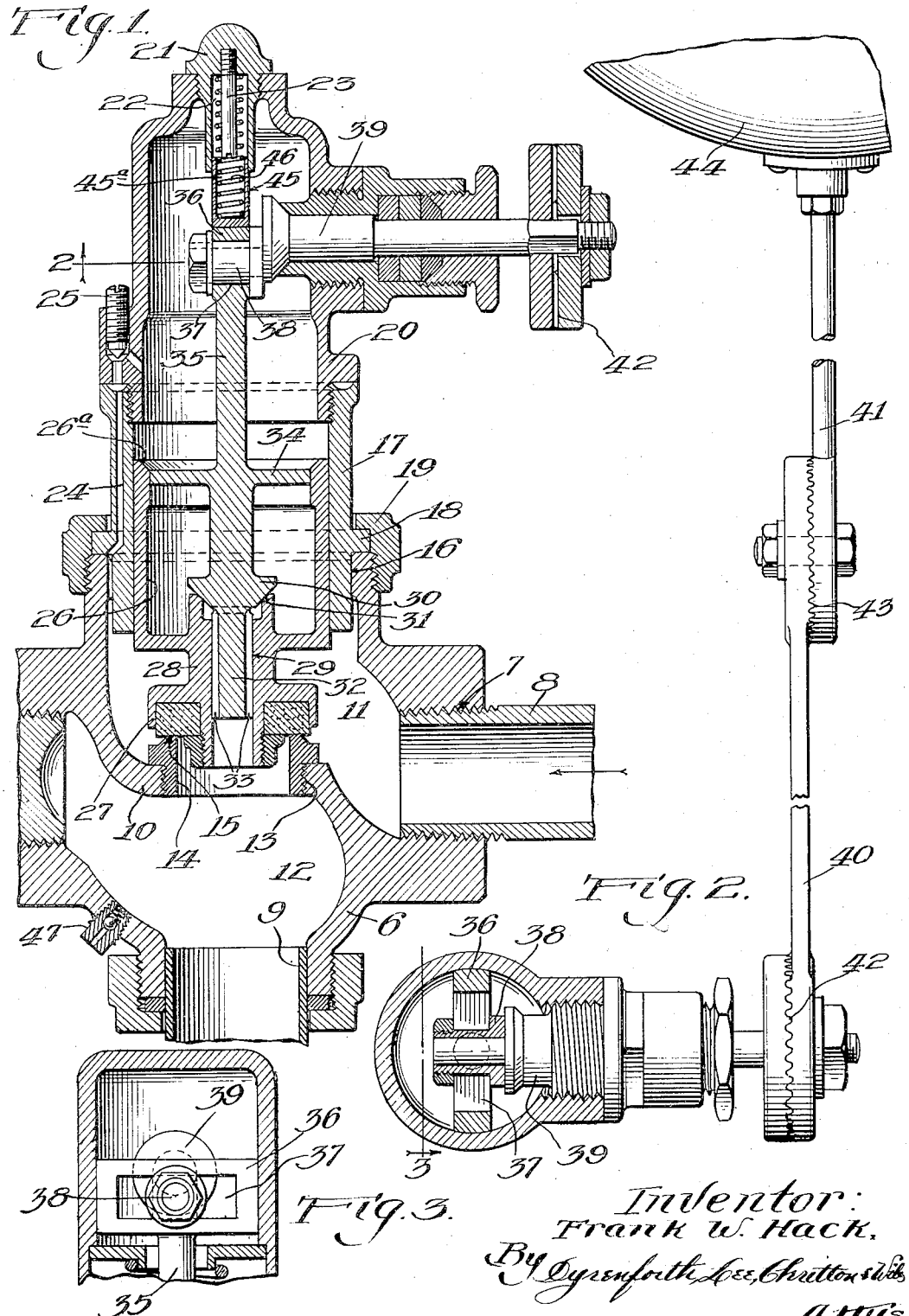

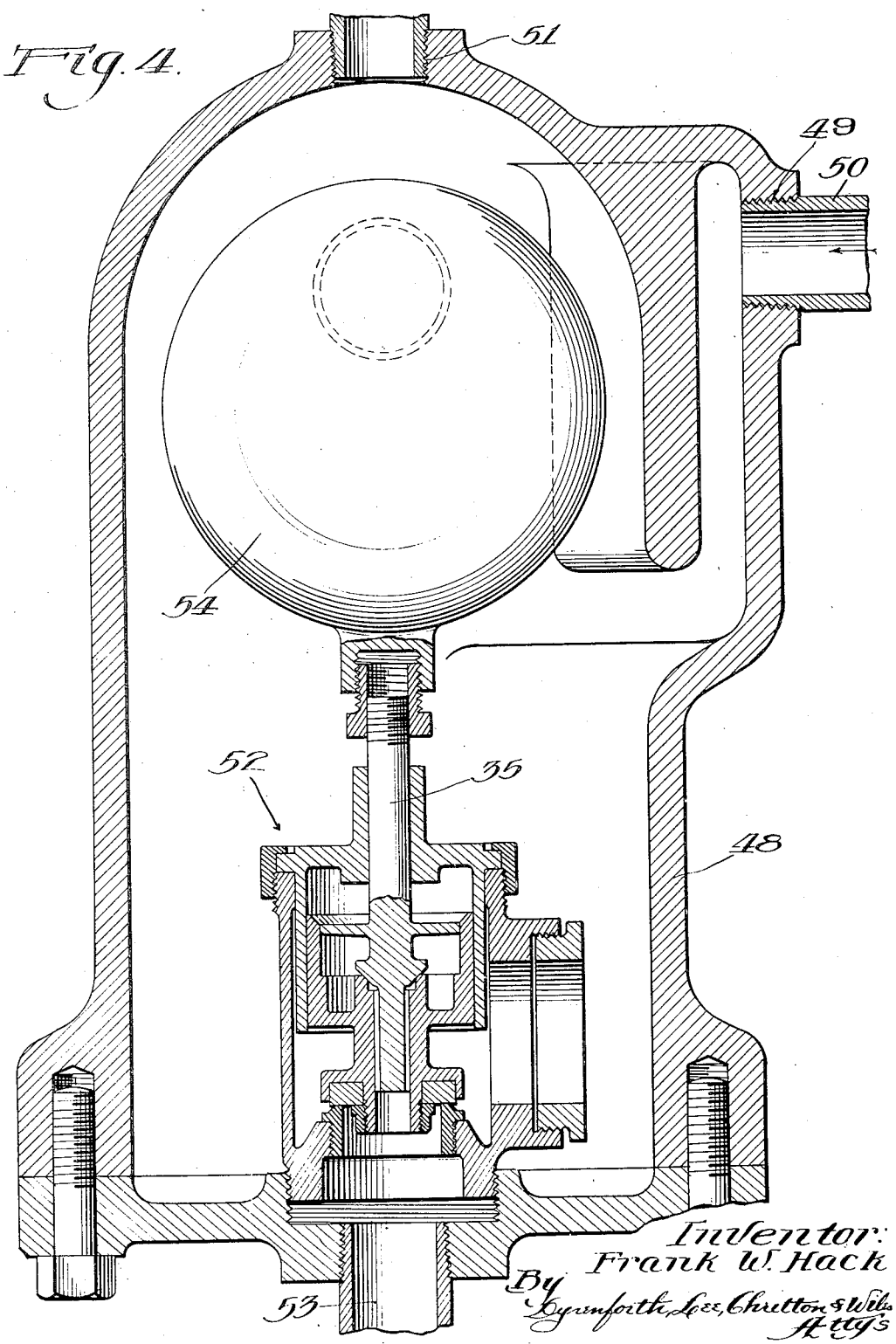

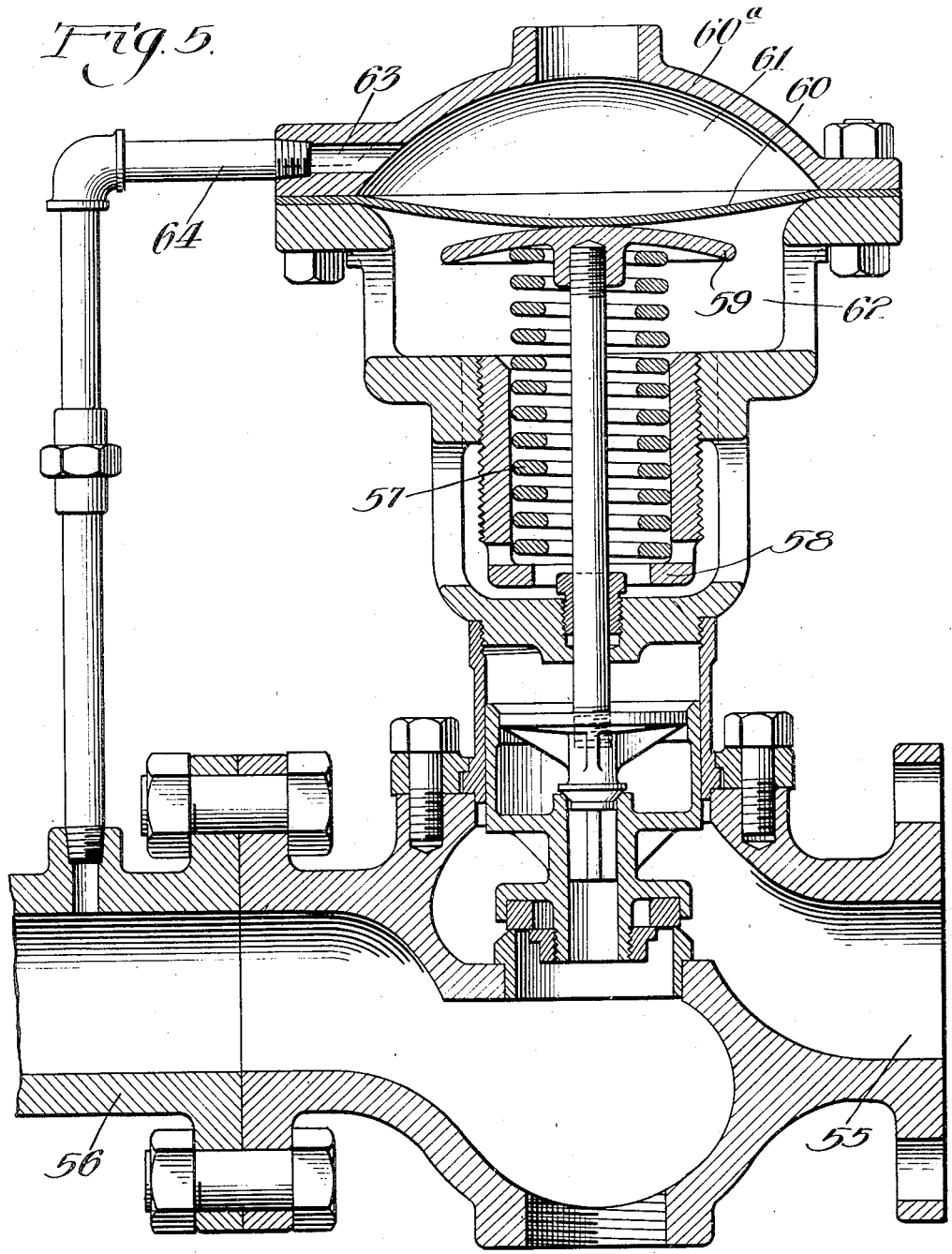

1,955,495

UNITED STATES PATENT OFFICE 1,955,495

VALVE STRUCTURE

Frank W. Hack, Maywood, Ill.

Application August 6, 1930, Serial No. 473,420

27 Claims. (Cl. 137—104)

My invention relates to valve construction suitable for embodiment in valve structures of various kinds and provided for various uses, as for example, and more particularly, float valves, flush valves, shower bath controls, steam traps, and regulator valves.

Certain of my objects are to provide a novel, simple, compact and inexpensive construction of valve device which will operate smoothly and without chatter; be sensitive in action; the likelihood of impairment of its parts be reduced to the minimum; be practically noiseless in operation; present the minimum of resistance to flow of liquid therethrough; and the parts of which may be readily assembled and disassembled without disconnecting the device from the line.

In connection with the embodiment of the device as a flush valve certain other objects are to provide a construction by which the amount of water flowing therethrough may be accurately regulated by the degree to which the actuating element of the device is moved; by which large volumes of water on low pressure lines or reduced volumes on high pressure lines, may be delivered; by which the length of flow may be controlled at will and, if desired, flushing instantly discontinued at any stage which is desirable in the case of a clogged bowl or where it is desirable that the water supply be conserved.

Referring to the accompanying drawings:

Figure 1 is a view in vertical sectional elevation of a float valve structure embodying my invention.

Figure 2 is a sectional view taken at the line 2 on Fig. 1 and viewed in the direction of the arrow.

Figure 3 is a broken sectional view taken at the line 3 on Fig. 2 and viewed in the direction of the arrow.

Figure 4 is a view in vertical sectional elevation of a steam trap embodying my invention; and Figure 5, a view in elevation, partly sectional, of a regulator valve structure embodying my invention.

Referring to the structure shown in Figs. 1, 2 and 3, it comprises a hollow member 6 containing a lateral inlet 7 communicating with a pipe 8 leading from a supply of liquid to be controlled, the pipe 8 by way of example, being a service water line, and an outlet 9 in its lower end through which the liquid, under the control of the valve device hereinafter described, flows, the member 6 being provided with a partition 10 dividing the interior of the member 6 into upper and lower chambers 11 and 12, and containing an opening 13 in which a gland 14, presenting an upwardly-flaring valve seat 15, is screwed.

The top of the member 6 contains an opening 16 in which a hollow cylinder 17 extends, this cylinder being shown as provided with an annular flange 18 at which it seats on the top of the wall of the opening 16, a gland 19, lapping the flange 18 and screwed upon the upper tubular end of the member 6, holding the cylinder 17 in place.

Screwed into the upper end of the cylinder 17 and lapping the upper end of the latter, is a casing-section 20 with an opening in its top in which is screwed a plug 21 presenting a downwardly opening socket 22 containing an adjustable stop device 23, shown as in the form of a screw threaded in the plug, for a purpose hereinafter described.

The cylinder 17 is spaced, at its lower end, laterally from the wall of the member 6 and extending from the chamber 11 into the space within the casing-section 20 is a passage 24 forming a bypass, a screw 25 adjustably mounted in the casing-section 20 being provided to regulate the effective opening in the passage 24.

Slidable in the cylinder 17 is the main valve of the valve structure, this main valve comprising an upper cylindrical hollow member 26 slidably fitting within the cylinder 17 and having an upwardly and outwardly annularly flared surface 26$^a$; a lower valve portion 27 of less diameter than the member 26 and adapted to cooperate with the seat 15; and a neck portion 28 connecting the member 26 and valve portion 27, the main valve containing a passage 29 therethrough.

Slidable in the cylinder member 26 is an auxiliary valve formed of a valve proper 30 shown as of tapering form which seats downwardly upon a valve seat 31 provided on the main valve structure within the confines of the cylinder member 26. The auxiliary valve also comprises a depending stem portion 32, fluted as represented at 33 and slidable in the passage 29, and a piston 34, shown in the form of a disk, rigid with the valve proper 30 and reciprocable in the cylinder member 26 with a slight clearance between the piston 34 and member 26, preferably substantially 5/1000 of an inch.

The auxiliary valve structure has an upwardly projecting stem 35 provided at its upper end with a cross-head 36 containing a horizontal slot 37 into which a crank pin 38 extends, this pin being fixed on the inner end of a rock shaft 39 journalled in a side of the casing section 20 and operating, when rocked, to operate the auxiliary valve. The pin 38 and slot 37 are preferably so proportioned that a clearance of about 1/64 of an inch is provided therebetween. The rock shaft 39 is provided at its outer end with a laterally extending arm preferably formed of a plurality of sections 40 and 41 angularly adjustable on the rock shaft at the adjustable connection represented at 42 and relative to each other at the adjustable connection represented at 43, the outer end of the section 41 being provided with a float 44 which in the use of the valve structure would extend into the tank (not shown) the supplying of the liquid to which is to be controlled by the above described valve mechanism.

The stem 35 extends at a cylindrical portion 45 thereof upwardly above the cross head 36, the portion 45 having sliding telescoping fit with the wall of the socket 22, and containing an upwardly opening socket 45ª. Extending at its opposite ends into the sockets 22 and 45ª and engaging at its ends with the end walls of these sockets is a coil spring 46 which tends to force downwardly the stem and the parts cooperating therewith, the coil spring preferably snugly, yet slidingly, fitting the adjustable stop 23.

In the normal closed condition of the valve structure the pressure of the liquid is uniform throughout the spaces above the partition 10 and thus the main and auxiliary valves engage with the respective seats with which they cooperate, the weight of these valves aided by the spring 46, causing both valves to be in closed position.

In the turning of the shaft 39 by the lowering of the level of the liquid in which the float operates, the crank 38 is swung upwardly thereby raising the auxiliary valve 30 which permits of the escape of the liquid in the cylinder member 26 through the passage 29 and to the outlet 9 of the valve casing, thereby reducing the pressure within the member 26, whereupon, by reason of the large area of surface presented by the lower end of the cylindrical member 26 to the upwardly directed liquid pressure, as compared with the smaller area of surface presented by the valve 27 to the downwardly directed liquid pressure, the main valve 27 opens thus opening the inlet 11 of the valve casing to the outlet 9 thereof. So long as the auxiliary valve remains in raised position liquid continues to discharge from the supply through the outlet 9. As the float rises it forces the auxiliary valve and with it the main valve downwardly against the resistance of the liquid pressure in the chamber 11 and operating against the cylinder member 26 and the valve 27 as stated above, to a position in which the main valve 27 closes, whereupon equalization of the liquid pressure in the spaces above the partition 10 becomes again built up. In this operation the pressure builds up gradually in the upper chamber as valve 30 tends to close, this pressure balancing off and hydraulically holding the valve 22 from chattering.

While the structure shown is provided with a by-pass 24 such by-pass is not necessary in the float valve structure.

The adjustable stop 23 serves to prevent undue swinging movement of the float valve lever and rotation of the rock shaft 39.

The structure shown also represents the embodiment of my invention in a flush valve structure in which case the rock shaft 39 instead of having the float-equipped lever 40 connected therewith would be provided at its outer end with any suitable handle.

In such structure the by-pass 24 is preferably employed and the spring 46 would serve merely to insure the closing of the main valve 27 sufficiently to insure the building up of liquid pressure in the valve structure sufficient to start the closing of the main valve whereupon the structure would function to automatically shut off the flow of liquid from the inlet 8 to the outlet 9.

The stop device 23 in such a structure would permit of adjustment of such a valve mechanism to cause it to perform to the best advantage under different line pressures.

In the embodiment of my invention in either a float valve or flush valve the valve casing 6 at its outlet side would preferably be provided with an inwardly opening check valve as represented at 47 the function of which is to break the vacuum which usually is produced especially in angle type valves, when the valve is closing due to the suction produced by the falling of the water in the pipe communicating with, and depending from, the outlet 9, the valve 47 permitting air to enter the valve casing when vacuum exists in the latter and automatically closing against the escape of liquid from the casing.

Referring to Fig. 4 of the drawings, this figure shows my invention as embodied in a steam trap, the casing portion of which is represented at 48 and contains an opening 49 near its upper end communicating with the steam-line 50.

The purpose of this trap is to form a receptacle in which the steam condensing from the line 50 is received and from which it is automatically discharged, but without opening the steam line 50 to the atmosphere.

The casing 48 is provided with an opening 51 at its top which, in accordance with common practice would be connected with a petcock air vent.

The automatic discharge of the water collecting in the casing 48 is effected through the medium of a float controlled valve device represented generally at 52 and constructed in accordance with my invention.

The general construction of this valve device is the same as that shown in Figs. 1, 2 and 3, the same numerals being applied to the various parts of this valve device as are given to the corresponding parts of the valve device of the preceding figures.

In this construction the valve device is opened to permit water collecting in the casing 48 to flow through the outlet 53 of this casing when the water level therein reaches a certain height, by the buoying action of the water on a float 54 connected with the upper end of the auxiliary valve stem 35, it being understood that by this arrangement the level of the water in the casing 48 never drops below a predetermined point.

As will be noted, the valve mechanism of Fig. 4 is not shown as provided with a by-pass corresponding with the by-pass 24 of the preceding figures. Where such by-pass is omitted the piston member 26 should fit the cylinder 17 fairly loosely, preferably with about .008 inch clearance, to permit of the equalization of the pressure above and below the piston member 26.

In Fig. 5, I have shown my invention as embodied in a regulator valve for regulating the pressure, such as steam pressure, in an outlet line to render it a constant. In this construction the inlet through which the fluid, as for example steam, is supplied at relatively high pressure, is represented at 55 and the outlet pipe in which the pressure of the fluid is to be regulated, at 56.

The valve for controlling communication between the inlet and outlet 55 and 56 is of the same general construction as disclosed in Figs. 1, 2 and 3 except that the movable parts of the valve are yieldingly forced toward seating position by a coil spring 57 interposed between a stationary part 58 of the valve casing and a plate 59 provided on the upper end of the valve stem 35.

The valve stem 35 of this structure cooperates at its plate-portion 59 with a diaphragm 60 mounted in a diaphragm casing 60ª, the diaphragm 60 dividing this casing into two non-communicating compartments 61 and 62, the compartment 62 being open to the atmosphere and the compartment 61 having a port 63 which communicates by a pipe 64 with the outlet pipe 56. When the pressure in the compartment 61, responsive to the lowering of the pressure in pipe 56, becomes reduced the pressure of the spring 57 against the underside of the diaphragm 59 forces the latter upwardly thereby opening the valve to supply to the pipe 56 fluid pressure sufficient to re-establish in the pipe 56 the pressure desired to be maintained therein.

The feature of providing for the operation of the valve device by the mechanism shown in Figs. 1, 2 and 3 and involving the eccentric 38, is of advantage inasmuch as by utilizing the eccentric principle for operating the valve device very precise and fine adjustment of the flow of fluid pressure between the flared wall 26ª of the member 26 and the relatively thin disk section 34, may be effected and the pressure conditions within the upper valve chamber so finely adjusted and balanced that in the use of this mechanism chatter or the effects of surging water in the valve device may be eliminated even in the case of a float valve which is peculiarly susceptible to chatter due to the bobbing of the float on the agitated water in the float tank during the discharge of the water into the latter.

The positioning of the eccentric so that in the final closing movement of the valves, the eccentric is on dead center as shown, is of advantage as the eccentric exerts, in its final closing movement, a pinching action against the valves, locking them against the seats with which they cooperate; the positioning of the eccentric as stated also serving to so minimize the transmission of motion from the float, in bobbing on the agitated water in the float tank, to the parts which are controlled by the float, that the motion of such parts is practically nil in the closing movement of the valve, which greatly minimizes the tendency to chatter, because of the fact that the eccentric swings through a substantially horizontal arc as the valve nears its final closed position and therefore substantially great vertical movement of the float produces only a slight vertical movement of the eccentric.

The clearance between the eccentric and the slot 37 in the cross head also aids in the elimination of chatter particularly such as might be otherwise produced by minor vibrations or variations of fluid pressure in the different parts of the valve device; and, in conjunction with the spring 46, serves to prevent snap closing of the valve, the spring 46 operating, during the closing of the valve, to press the cross head downwardly against the eccentric, the clearance between the eccentric and the slot 37 being at the bottom of this slot and thus, together with the gradually increasing fluid pressure against the auxiliary valve, tends to force this valve against the seat 31 slightly in advance of the closing action, or pinch of the eccentric. However, in certain phases of the functioning of the valve mechanism, the eccentric will engage with the bottom wall of the slot 37 depending upon the peculiar state of balance of the pressures within the valve device, the capability of certain parts to float, due to the clearance between the eccentric and the cross head, also aiding in the elimination of chatter.

Furthermore, the eccentric mechanism referred to furnishes a means of exerting a powerful lifting force on the auxiliary valve in opposition to the hydraulic pressure in the upper chamber tending to hold it to its seat, and also permits of very fine and sensitive adjustment of the flow of fluid pressure past the orifice to which the fluid discharges to the outlet of the valve mechanism.

While I have illustrated and described certain forms of valve mechanisms embodying my invention, I do not wish to be understood as intending to limit it thereto as the construction shown may be variously modified and altered, without departing from the spirit of my invention.

What I claim as new, and desire to secure by Letters Patent, is:

1. In valve mechanism, the combination of a casing having an inlet and an outlet, a main valve controlling the flow from said inlet to said outlet, a chamber in communication with said inlet, a hollow member movable with said main valve and open to said chamber and said outlet, an auxiliary valve controlling communication between the interior of said member and said outlet, and a second member movable with said auxiliary valve and regulating communication between said hollow member and said chamber.

2. In valve mechanism, the combination of a casing having an inlet and an outlet, a main valve controlling the flow from said inlet to said outlet, a chamber in communication with said inlet, a hollow member movable with said main valve and open to said chamber and said outlet, an auxiliary valve controlling communication between the interior of said member and said outlet, and a second member movable with said auxiliary valve and in said hollow member and regulating communication between said hollow member and said chamber.

3. In valve mechanism, the combination of a casing having an inlet and an outlet, a main valve controlling the flow from said inlet to said outlet, a chamber in communication with said inlet, a hollow member movable with said main valve and open to said chamber and said outlet, an auxiliary valve controlling communication between the interior of said member and said outlet, and a second member of larger diameter than said auxiliary valve and movable with the latter and automatically regulating communication between said hollow member and said chamber.

4. In valve mechanism, the combination of a casing having an inlet and an outlet, a main valve controlling the flow from said inlet to said outlet, a chamber in communication with said inlet, a hollow member movable with said main valve and open to said chamber and said outlet, an auxiliary valve controlling communication between the interior of said member and said outlet, and a second member of larger diameter than said auxiliary valve and movable with the latter and in said hollow member and regulating communication between said hollow member and said chamber.

5. In valve mechanism, the combination of a casing having an inlet and an outlet, a main valve controlling the flow from said inlet to said outlet, a chamber in communication with said inlet, a hollow member movable with said main valve and open to said chamber and said outlet, an auxiliary valve controlling communication between the interior of said member and said outlet, and a piston movable with said auxiliary valve in said hollow member and regulating communication between said hollow member and said chamber.

6. In valve mechanism, the combination of a casing having an inlet and an outlet, a main valve controlling the flow from said inlet to said outlet, a chamber in communication with said inlet, a hollow member movable with said main valve and open to said chamber and said outlet, an auxiliary valve controlling communication between the interior of said member and said outlet, and a piston of larger diameter than said auxiliary valve and movable with the latter in said hollow member and regulating communication between said hollow member and said chamber.

7. In valve mechanism, the combination of a casing having an inlet and an outlet, a main valve controlling the flow from said inlet to said outlet, a chamber in communication with said inlet, a hollow member movable with said main valve and open to said chamber and said outlet, the inner wall of said hollow member flaring toward the end thereof at which it communicates with said chamber, an auxiliary valve controlling communication between the interior of said member and said outlet and a second member movable with said auxiliary valve and movable in said hollow member along said flaring wall and regulating communication between said hollow member and said chamber.

8. In valve mechanism, the combination of a casing having an inlet and an outlet, a main valve controlling the flow from said inlet to said outlet, a chamber in communication with said inlet, a hollow member movable with said main valve and open to said chamber and said outlet, the inner wall of said hollow member flaring toward the end thereof at which it communicates with said chamber, an auxiliary valve controlling communication between the interior of said member and said outlet and a piston member movable with said auxiliary valve in said hollow member along said flaring wall portion.

9. In valve mechanism, the combination of a casing having an inlet and an outlet, a main valve controlling the flow from said inlet to said outlet, a chamber in communication with said inlet, a hollow member movable with said main valve and open to said chamber and said outlet, an auxiliary valve controlling communication between the interior of said member and said outlet, a second member movable with said auxiliary valve and regulating communication between said hollow member and said chamber, and means operating to force said main valve to closed position.

10. In valve mechanism, the combination of a casing having an inlet and an outlet, a main valve controlling the flow from said inlet to said outlet, a chamber in communication with said inlet, a hollow member movable with said main valve and open to said chamber and said outlet, an auxiliary valve controlling communication between the interior of said member and said outlet, a second member movable with said auxiliary valve and in said hollow member and regulating communication between said hollow member and said chamber, and means operating to force said main valve to closed position.

11. In valve mechanism, the combination of a casing having an inlet and an outlet, a main valve controlling the flow from said inlet to said outlet, a chamber in communication with said inlet, a hollow member movable with said main valve and open to said chamber and said outlet, an auxiliary valve controlling communication between the interior of said member and said outlet, a second member movable with said auxiliary valve and regulating communication between said hollow member and said chamber, and means operating to force said auxiliary valve to closed position.

12. In valve mechanism, the combination of a casing having an inlet and an outlet, a main valve controlling the flow from said inlet to said outlet, a chamber in communication with said inlet, a hollow member movable with said main valve and open to said chamber and said outlet, an auxiliary valve controlling communication between the interior of said member and said outlet, and a second member movable with said auxiliary valve and regulating communication between said hollow member and said chamber, said main valve and said hollow member having portions subjected to the pressure of the liquid entering said casing, said portion of said hollow member being of greater effective area than said portion of said main valve, the areas of the surfaces subjected to the incoming liquid in the open position of the valve being such that the incoming liquid forces said main valve to closed position.

13. In valve mechanism, the combination of a casing having an inlet and an outlet, a main valve controlling the flow from said inlet to said outlet, a chamber in communication with said inlet, a hollow member movable with said main valve and open to said chamber and said outlet, an auxiliary valve controlling communication between the interior of said member and said outlet, and a second member movable with said auxiliary valve and in said hollow member and regulating communication between said hollow member and said chamber, said main valve and said hollow member having portions subjected to the pressure of the liquid entering said casing, said portion of said hollow member being of greater effective area than said portion of said main valve, the areas of the surfaces subjected to the incoming liquid in the open position of the valve being such that the incoming liquid forces said main valve to closed position.

14. In valve mechanism, the combination of a casing having an inlet and an outlet, a main valve controlling the flow from said inlet to said outlet, a chamber in communication with said inlet, a hollow member movable with said main valve and open to said chamber and said outlet, an auxiliary valve controlling communication between the interior of said member and said outlet, a second member movable with said auxiliary valve and regulating communication between said hollow member and said chamber, a rotary shaft the axis of rotation of which is disposed at an angle to the path of movement of said auxiliary valve, and eccentric means actuated by said shaft for actuating said auxiliary valve, and said member to variably adjust the restriction of both member and auxiliary valve.

15. In valve mechanism, the combination of a casing having an inlet and an outlet, a main valve controlling the flow from said inlet to said outlet, a chamber in communication with said inlet, a hollow member movable with said main valve and open to said chamber and said outlet, an auxiliary valve controlling communication between the interior of said member and said outlet, a second member movable with said auxiliary valve and regulating communication between said hollow member and said chamber, a rotary shaft the axis of rotation of which is disposed at an angle to the path of movement of said auxiliary valve, and eccentric means actuated by said shaft for actuating said auxiliary valve, said eccentric means being so disposed that in the closed position of said valves said eccentric means are substantially on dead center.

16. In valve mechanism, the combination of a casing having an inlet and an outlet, a main valve controlling the flow from said inlet to said outlet, a chamber in communication with said inlet, a hollow member movable with said main valve and open to said chamber and said outlet, the inner wall of said hollow member flaring toward the end thereof at which it communicates with said chamber, an auxiliary valve controlling communication between the interior of said member and said outlet, a second member movable with said auxiliary valve and within said hollow member along said flaring wall and regulating communication between said hollow member and said chamber, a rotary shaft the axis of rotation of which is disposed at an angle to the path of movement of said auxiliary valve, and eccentric means actuated by said shaft for actuating said valve mechanism.

17. In valve mechanism, the combination of a casing having an inlet and an outlet, a main valve controlling the flow from said inlet to said outlet, a chamber in communication with said inlet, a hollow member movable with said main valve and open to said chamber and said outlet, an auxiliary valve controlling communication between the interior of said member and said outlet, a second member movable with said auxiliary valve and regulating communication between said hollow member and said chamber, a rotary shaft the axis of rotation of which is disposed at an angle to the path of movement of said auxiliary valve, a slotted cross head on said auxiliary valve, and an eccentric actuated by said rotary shaft and extending into said slot.

18. In float-valve mechanism, the combination of a casing having an inlet and an outlet, a main valve controlling the flow from said inlet to said outlet, a chamber in communication with said inlet, a hollow member movable with said main valve and open to said chamber and said outlet, an auxiliary valve controlling communication between the interior of said member and said outlet, a second member movable with said auxiliary valve and regulating communication between said hollow member and said chamber, a rotary shaft the axis of rotation of which is disposed at an angle to the path of movement of said auxiliary valve, a float for actuating said shaft, and eccentric means actuated by said shaft for actuating said auxiliary valve and said member.

19. In a valve, the combination of a casing having an inlet and an outlet, a main valve controlling the flow from said inlet to said outlet, a chamber in communication with said inlet, a hollow member movable with said main valve and open to said chamber and said outlet, an auxiliary valve controlling communication between the interior of said member and said outlet, a second member movable with said auxiliary valve and regulating communication between said hollow member and said chamber, a rotary shaft the axis of rotation of which is disposed at an angle to the path of movement of said auxiliary valve, a spring yieldingly urging said auxiliary valve toward closed position, and means actuated by said shaft for actuating said auxiliary valve.

20. In valve mechanism, the combination of a casing having an inlet and an outlet, a main valve controlling the flow from said inlet to said outlet, a chamber in communication with said inlet, a hollow member movable with said main valve and open to said chamber and said outlet, a reciprocable auxiliary valve controlling communication between the interior of said member and said outlet, a second member movable with said auxiliary valve and regulating communication between said hollow member and said chamber, a rotary shaft the axis of rotation of which is disposed at an angle to the path of movement of said auxiliary valve, and eccentric means actuated by said shaft for actuating said auxiliary valve, and means beyond said eccentric and engaging said auxiliary valve for guiding the latter.

21. In valve mechanism, the combination of a casing having an inlet and an outlet, a main valve controlling the flow from said inlet to said outlet, a chamber in communication with said inlet, a hollow member movable with said main valve and open to said chamber and said outlet, an auxiliary valve controlling communication between the interior of said member and said outlet, a second member movable with said auxiliary valve and regulating communication between said hollow member and said chamber, a rotary shaft the axis of rotation of which is disposed at an angle to the path of movement of said auxiliary valve, and eccentric means actuated by said shaft for actuating said auxiliary valve, said auxiliary valve and said eccentric being relatively slightly movable to provide slight lost motion between them.

22. In valve mechanism, the combination of a casing having an inlet and an outlet, a main valve controlling the flow from said inlet to said outlet, a chamber in communication with said inlet, a hollow member movable with said main valve and open to said chamber and said outlet, an auxiliary valve controlling communication between the interior of said member and said outlet, and a piston movable with said auxiliary valve in said hollow member and restrictably regulating flow from said chamber through said hollow member and outlet.

23. In valve mechanism, the combination of a casing having an inlet and an outlet, a main valve controlling the flow from said inlet to said outlet, a chamber in communication with said inlet, a hollow member movable with said main valve and open to said chamber and said outlet, an auxiliary valve controlling communication between the interior of said member and said outlet, and a piston movable with said auxiliary valve in said hollow member, with a clearance between said piston and the side of said hollow member, said piston and member in their relative movements co-operating to provide a variable orifice through which the fluid flows into said member, said clearance being of less cross sectional area than the area provided at the outlet of said member and controlled by said auxiliary valve, and said orifice being variable with the vertical position of said piston in relation to the vertical position of said hollow member and variable with the discharge capacity of said auxiliary valve in performing its regulating function, said piston, in combination with said auxiliary valve, restrictably regulating the flow from said chamber through said outlet.

24. In valve mechanism, the combination of a casing having an inlet and an outlet, a main valve controlling the flow from said inlet to said outlet, a chamber in communication with said inlet, a hollow member movable with said main valve and open to said chamber and said outlet, an auxiliary valve controlling communication between the interior of said member and said outlet, and a second member movable with, and having fixed relation to, said auxiliary valve and regulating communication between said hollow member and said chamber.

25. In valve mechanism, the combination of a casing having an inlet and an outlet, a main valve controlling the flow from said inlet to said outlet, a chamber in communication with said inlet, a hollow member movable with said main valve and open to said chamber and said outlet, an auxiliary valve controlling communication between the interior of said member and said outlet, and a second member movable with said auxiliary valve and operating in said hollow member and substantially closing the latter in one position against passage of fluid therethrough from said chamber to said outlet and regulating communication between said hollow member and said chamber.

26. In valve mechanism, the combination of a casing having an inlet and an outlet, a main valve controlling the flow from said inlet to said outlet, a chamber in communication with said inlet, a hollow member movable with said main valve and open to said chamber and said outlet, and valve means comprising a plurality of valve elements operatively connected for movement together, one of said elements controlling communication between said hollow member and outlet and the other of said valve elements being located between said first-referred-to valve element and said chamber and controlling the flow of fluid from said chamber to said hollow member.

27. In valve mechanism, the combination of a casing having an inlet and an outlet, a main valve controlling the flow from said inlet to said outlet, a chamber in communication with said inlet, a hollow member movable with said main valve and open to said chamber and said outlet, an auxiliary valve controlling communication between the interior of said member and said outlet, and a second member movable with said auxiliary valve and operating in and out of said hollow member and regulating communication between said hollow member and said chamber.

FRANK W. HACK.